Patented Oct. 22, 1940

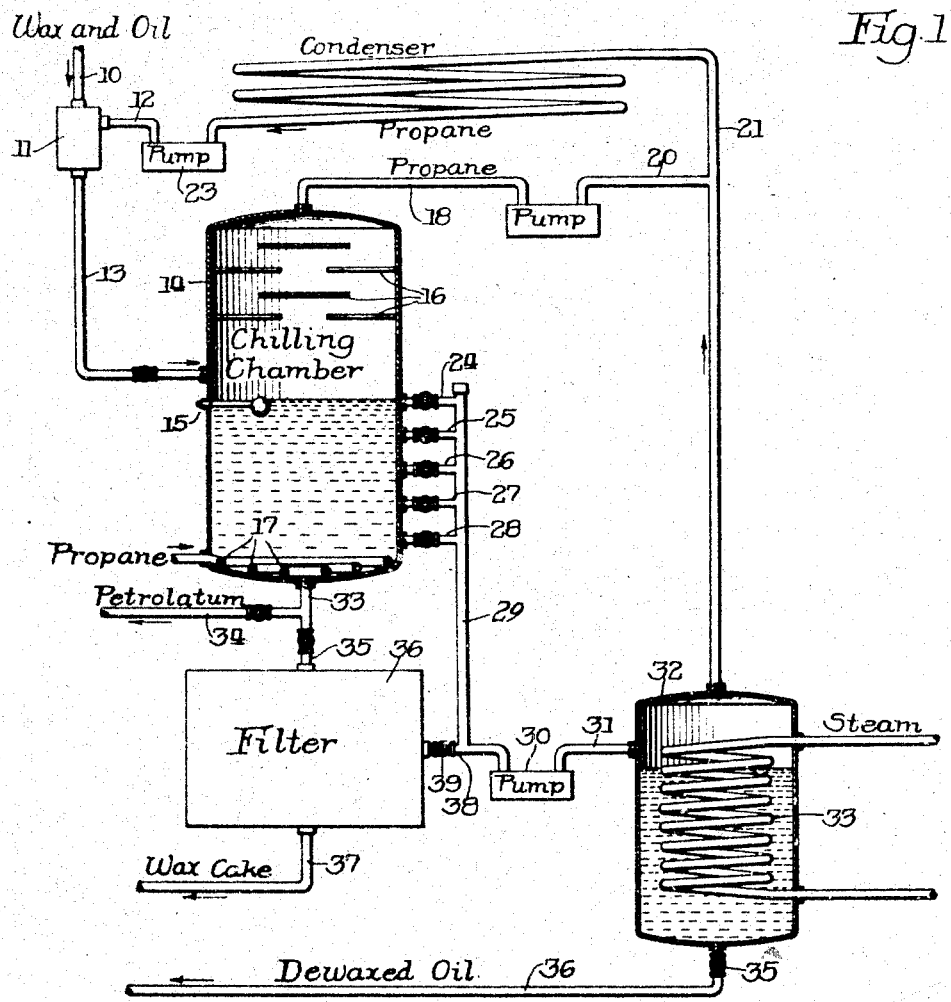
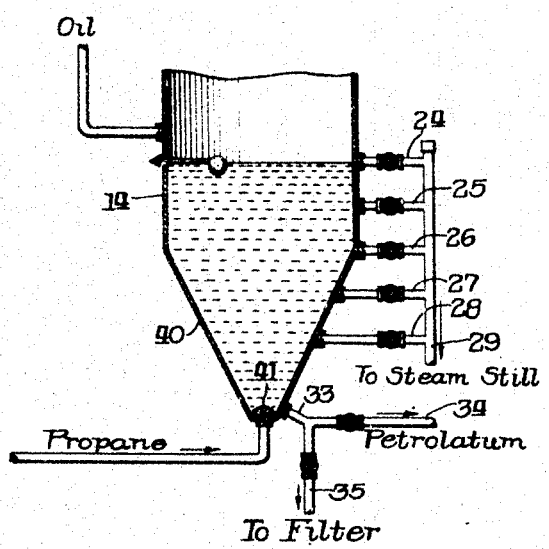

2,218,511

UNITED STATES PATENT OFFICE 2,218,511

SEPARATING WAX FROM OILS

Harold V. Atwell, Hammond, Ind., assignor to Standard Oil Company, Chicago, Ill., a corporation of Indiana Application August 7, 1930, Serial No. 473,644

12 Claims. (Cl. 196—18)

This invention relates to the separation of wax from oils and it pertains more particularly to the dewaxing of petroleum oils.

Petroleum oils may contain high boiling waxes called petrolatum, and relatively low boiling waxes called paraffin. Petrolatum wax is somewhat amorphous, it cannot be easily filtered because it clogs the pores of the filter, and it is usually separated from the oil by settling and decantation. Paraffin wax cannot be easily settled because of its pronounced crystalline structure, and it is usually separated from the oil by pressing or filtering. The present trend in petroleum refineries is toward the manufacture of lubricating oil entirely from distillates. This means that both petrolatum and paraffin wax are present in the same oil and consequently the wax cannot be readily removed by either settling or pressing. Furthermore, centrifuging is extremely difficult because the waxes are of approximately the same specific gravity as the oils and because mechanical difficulties are numerous, especially at the low temperatures at which separation must be effected. The object of my invention is to provide a means for separating wax from oil whereby the oil may be more rapidly cooled, may be reduced to a lower viscosity, and may be provided with a lower specific gravity so that the aforementioned processes may be used for wax separation even when mixtures of paraffin and petrolatum are found in the same oil.

A further object of my invention is to avoid the expensive equipment which has heretofore been required for indirect heat exchange in cooling apparatus. A further object is to decrease the cost of separating diluent from finished oil and to provide a more complete separation at low temperatures. A further object is to provide a simpler, more efficient and a more economical process for separating wax from oil.

In practicing my invention I use an excess of a volatile low boiling hydrocarbon, such as propane, as a diluent for the oil. I then refrigerate the oil by a controlled evaporation of the diluent. I have discovered that the viscosity of the propane-oil mixture is so low and its specific gravity is also so low that petrolatum wax may be readily settled out even when it is associated with paraffin wax. I have discovered that when my improved method is used for separating pressable wax from oils, the filter rate may be markedly increased. The invention is also applicable to the separation of wax from oil by means of a centrifuge or by means of other mechanical devices.

My invention will be more clearly understood from a description of preferred embodiments thereof which are shown in the accompanying drawing wherein:

Fig. 1 is a diagrammatic elevation largely in section, illustrating my improved dewaxing system, and Fig. 2 is a modified chilling chamber adapted to be used in said system.

The wax-bearing oil may be conducted by pipe 10 from a suitable source to mixer 11, wherein it is mixed with a liquefied light hydrocarbon, such as propane, introduced by pipe 12. The mixture of wax-bearing oil and propane is then conducted by pipe 13 to chilling chamber 14, which may be provided with a suitable float controlled indicating device 15 for indicating the liquid level. In the top of this chamber I provide a plurality of baffles 16 for preventing a loss of oil by entrainment. At the base of the chamber I provide perforated pipes 17 for the introduction of a fluid agitating medium, which may be propane or other hydrocarbon in the liquid or gaseous state.

Vapors are removed from the top of the chamber through pipe 18 by pump 19, which forces them through pipes 20 and 21 to condenser 22, wherein they are liquefied and returned by pump 23 through pipe 12 to mixer 11 as hereinabove described.

A series of valved pipes 24, 25, 26, 27 and 28 are provided at the side of the chilling chamber for drawing off clear oil through pipe 29, pump 30 and pipe 31 into steam still 32. This, of course, is only done when the wax can be settled more readily than it can be filtered or centrifuged.

The draw-off pipe 33 leads from the base of the chilling chamber through valved pipe 34 to a petrolatum tank or through valved pipe 35 to a wax filter or press 36. Filter 36 may be of a continuous rotary type wherein the wax cake is scraped from rotating discs and is discharged by an auger or a worm through pipe 37. The filtrate from the filter press is withdrawn through pipe 38 and valve 39, and is forced by pump 30 through pipe 31 into steam still 32. The oil and diluent in still 32 is heated by steam in closed coil 33, the propane being removed through pipe 21, liquefied in condenser 22 and returned to the system by pump 23 and pipe 12. The dewaxed oil is discharged from the base of steam still 32 through reducing valve 35 and conduit 36.

The above apparatus may be used either for dewaxing oils by pressing, centrifuging or settling, and when used for dewaxing pressable oils it may be used as a continuous system and/or as a batch system.

An oil containing petrolatum may be charged into the chilling chamber with about two and one-half times its volume of liquefied propane. The mixture will normally be at room temperature, about 80° F., and for wax separation it is necessary to reduce the temperature to about −10° F. This chilling is accomplished by evaporation or boiling of the propane with which the oil is diluted. Propane vapors are removed by pump 19 thereby controlling the pressure in the chilling chamber, and the control of pressure in this chamber effects the desired rate of chilling. Since propane boils at about −44° F. at 760 mm. pressure, the chilling chamber may be maintained at a pressure slightly above atmospheric. The pressure in this chamber may be reduced, however, to obtain any desired rate of chilling. For the separation and settling of petrolatum I prefer to chill the mixture slowly, for instance, at the rate of about 3 or 4° per hour.

When the above proportions of propane and oil are employed the chilled mixture contains about 50% propane and it therefore is of relatively low specific gravity and of extremely low viscosity. Petrolatum wax may be settled out and the clear oil may be withdrawn through the valved pipes 24, 25, 26, etc. After the clear oil is decanted the petrolatum is agitated by blowing propane or other light hydrocarbon through perforated pipes 17 and the agitated mixture is withdrawn through pipes 33 and 34. Propane is removed from the oil in the steam still 32, and is removed from the petrolatum in suitable stills (not shown).

When the apparatus is used for removing pressable wax from oil, the mixture of oil and propane may be introduced in the manner and in the proportions above described (one part oil to two and one-half parts diluent) and the pressure may be reduced by pump 19 for removing propane vapors, the reduction of pressure in the chilling chamber causing rapid evaporation and boiling of the propane with which the oil is diluted. In this case I prefer to cool the oil as rapidly as possible, and in some cases I hasten the cooling by the introduction of propane or other light hydrocarbon through perforated pipes 17. When the chill temperature is reached (−10° F.) the oil-wax-propane mixture is withdrawn through pipe 35 to filter 36 where oil diluted with propane is rapidly separated from the wax crystals. The propane is removed from the filtered oil in steam still 32 and the propane from the filter chamber is likewise conserved, condensed and reintroduced into the system.

When pressable oil is dewaxed it may be continuously introduced into the chilling chamber, cooled therein, withdrawn from the base thereof, and filtered. In this case I maintain a predetermined liquid level in the chilling chamber which may be indicated and/or controlled by a suitable float device 15. A sufficient amount of liquid propane is mixed with the oil stream to insure about 50% of diluent in the mixture which enters the filter press.

In any of the above cases I may hasten the settling of petrolatum or increase the rate of filtration by adding suitable accelerating reagents. Cellular filter aids such as infusorial earth, diatomaceous earth, etc., may, in the continuous process, be added as a slurry to the incoming oil.

In Figure 2 I have shown a modification of my chilling chamber. In this case I provide chamber 14 with a conical or tapered bottom 40. At the lower end or apex of the conical bottom I provide a diffuser or nozzle 41 connected with a source of propane by pipe 42. Pipe 33 is connected to the conical base of the chamber immediately above the diffuser 41 and it is connected to pipe 34 for removing the petrolatum and pipe 35 for conducting pressable mixtures to a filter. The plurality of valve pipes 24, 25, 26, etc., are spaced at intervals along the side of this chamber so that the clear oil may be withdrawn from settled petrolatum, as above described.

The operation of this modification is similar to the operation of the first modification except that the liquid propane is introduced at the base of the chilling chamber instead of being mixed with the incoming oil. The pressure is regulated in this case so that about half of the propane introduced is evaporated for chilling the oil and about half of the propane remains in liquid form to serve as a diluent for said oil. The introduction of the propane at the apex of the conical bottom causes a constant agitation of the mixture, which is particularly desirable when oil containing pressable wax is being filtered.

In the above description I have described the use of propane as a diluent and refrigerant. This is merely given as an example of a low boiling, light, non-viscous hydrocarbon which is normally gaseous and which is particularly useful because its boiling point is about −44° F. I contemplate the use of similar hydrocarbons, such as isobutane (B. P. 10° F.), ethane (B. P. −127° F.), ethylene (B. P. −155° F.), propylene (B. P. −54° F.) etc. It is difficult to entirely separate these hydrocarbons, and I contemplate the use of hydrocarbon mixtures which will give the desired boiling point and which will have the desired effect of reducing viscosity and specific gravity.

While I have described preferred embodiments of my invention it is understood that I do not limit myself to the pressures shown or to the details described except as defined by the following claims.

I claim:

1. The method of separating wax from oil which comprises mixing a liquefied light low-boiling non-viscous hydrocarbon consisting chiefly of propane with the wax-bearing oil, evaporating a part of said hydrocarbon from said mixture in a chilling chamber whereby a portion of said hydrocarbon is removed, a portion substantially equal at least to the volume of oil is retained in the oil as diluent, and the temperature of the oil is lowered to solidify the wax, and separating the wax from the diluted oil.

2. The method of separating paraffin- petrolatum wax mixtures from oil which comprises diluting the oil containing said wax mixture with about 2½ volumes of a liquefied light hydrocarbon diluent consisting chiefly of propane, evaporating a portion of said diluent to refrigerate the oil, and mechanically separating the wax from oil diluted with at least an equal volume of the liquid diluent.

3. The method of removing wax from petroleum oils which comprises diluting an oil-wax mixture with a liquefied hydrocarbon diluent which has a vapor pressure lower than that of ethane and higher than that of butane, refrigerating the mixture of oil and liquefied hydrocarbon to cause solidification of wax, mechanically separating the wax from the diluted oil, and regulating the pressure in the system so that at least a volume of the liquefied hydrocarbon equal to the volume of the oil remains in liquid form to serve as a diluent.

4. The method of claim 3 wherein the liquefied hydrocarbon diluent consists chiefly of propane.

5. The method of claim 3 wherein the liquefied hydrocarbon diluent consists chiefly of iso-butane.

6. The process of claim 3 wherein the mechanical separation is dependent upon the difference in specific gravity between the diluted oil and the wax.

7. The method of removing wax from petroleum oils which comprises, diluting an oil wax mixture with a liquefied light hydrocarbon diluent having a vapor pressure lower than that of ethane and higher than that of butane, evaporating a portion of said diluent to refrigerate the oil, injecting additional amounts of said diluent into the body of the mixture for agitating said mixture and supplying additional diluent, and mechanically separating the wax from the oil diluted with said liquid diluent.

8. The method of preparing low pour point lubricating oils by dewaxing viscous mineral oils mixed with wax containing petrolatum, which comprises diluting said wax-bearing oil with a liquefied, normally gaseous diluent consisting chiefly of propane under superatmospheric pressure conditions, reducing the pressure on said diluted mixture and evaporating a portion of said diluent in direct contact with the oil whereby the oil is chilled to solidify said wax, retaining a large amount of said diluent in liquid form to cause the separation of wax in readily removable form from oil diluted with at least an equal volume of the liquefied diluent, mechanically removing substantially all of the wax from the solution of oil in the relatively large amount of liquefied, normally gaseous diluent, and removing the diluent from the wax-free oil.

9. The process of dewaxing a wax-containing oil which comprises dissolving the waxy oil in a liquefied, normally gaseous hydrocarbon consisting chiefly of propane and butane which is to serve both as a solvent and the refrigerant, chilling the solution to a wax separation temperature by the evaporation therefrom of a portion of the liquefied hydrocarbon, condensing the vapors so evolved and returning the condensate to the chilled mixture to maintain the concentration of the liquefied hydrocarbons in the mixture sufficiently high to allow the wax to separate rapidly therefrom, and recovering dewaxed oil from the mixture.

10. The method of removing wax from petrolatum oils which comprises diluting an oil wax mixture with a liquefied light hydrocarbon diluent having a vapor pressure lower than that of ethane and higher than that of butane, chilling said mixture to effect the solidification of wax, introducing additional amounts of said liquefied diluent into the chilled mixture prior to the wax separation step and separating the solidified wax from the oil diluted with said added diluent.

11. In apparatus for dewaxing mineral oils by the use of normally gaseous hydrocarbon diluents such as propane, which apparatus comprises means for diluting the waxy oil with propane under pressure, a chilling chamber, means for introducing the diluted waxy oil into said chilling chamber, means for removing propane vapors from the chilling chamber in regulated amounts for controlling the rate of cooling in said chilling chamber, means for compressing the removed propane vapors, for condensing said compressed vapors and for returning the condensed vapors to the diluting means, means for introducing additional propane into said chilling chamber, a filter, means for introducing cold propane-oil-wax mixtures from said chilling chamber to said filter, means for separately removing wax and diluted oil from said filter, means for heating the removed diluted oil at a temperature sufficient to vaporize propane therefrom and at a pressure sufficient to effect condensation of the vaporized propane without further compression and means for returning vaporized and condensed propane to said diluting means.

12. The apparatus of claim 11 wherein the filter is a continuous rotary filter.

HAROLD V. ATWELL.